United States Patent Office 3,649,618
Patented Mar. 14, 1972

3,649,618
CERTAIN 1-ARALKYL AZETIDINES
Bruce Wayne Horrom, Waukegan, Ill., assignor to Abbott Laboratories, North Chicago, Ill.
No Drawing. Continuation-in-part of application Ser. No. 684,492, Nov. 20, 1967. This application Oct. 2, 1970, Ser. No. 77,754
Int. Cl. C07d 25/00, 99/04
U.S. Cl. 260—239 A
4 Claims

ABSTRACT OF THE DISCLOSURE

A novel series of substituted 1-(phenylisopropyl)-3,3-dimethyl azetidines useful as appetite depressants.

CROSS-REFERENCE TO RELATED APPLICATIONS

This application is a continuation-in-part of copending U.S. Ser. No. 684,492, filed Nov. 20, 1967, and now abandoned.

DETAILED DESCRIPTION OF THE INVENTION

This invention is directed to novel series of chemical compounds, and more particularly, to a novel series of substituted α-methylphenethyl azetidines.

The compound of this invention may be generally represented by the structural formula

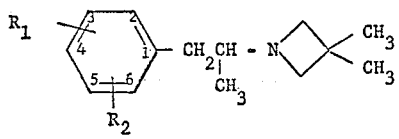

wherein $R_1$ and $R_2$ are the same or different members of the group consisting of hydrogen, chlorine, fluorine and trifluoromethyl. In addition to the foregoing, $R_1$ and $R_2$ when taken together at the 3- and 4-positions respectively, may form a cycloalkyl ring having from 3 to 5 carbon atoms and when taken together at the 4- and 5-positions respectively, may form a methylenedioxy ring system. These compounds may be prepared as the free bases, or more conveniently, as the pharmaceutically acceptable acid-addition salts.

The term "pharmaceutically acceptable acid-addition salts," as used herein, refers to the non-toxic salts which are prepared by reacting the free base with an organic or inorganic acid. Representative salts include the hydrochloride, hydrobromide, sulfate, bisulfate, acetate, valerate, oleate, laurate, borate, benzoate, lactate, phosphate, tosylate, citrate, maleate, fumarate, succinate, tartrate and the like.

Generally, these compounds are prepared by reacting an appropriately substituted α-methylphenethyl-3-halo-2,2-disubstituted propionamide with a reducing agent in an inert solvent. This reaction results in a cyclization of the terminal portion of the molecule forming the azetidine compound. The disubstituted propionamide intermediate compounds have the general structural formula

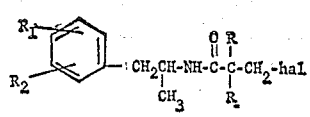

wherein $R_1$ and $R_2$ are as previously defined and R is a member independently selected from the group consisting of alkyl and aryl. These compounds are prepared by reacting an appropriately substituted α-methylphenethyl amine with a halo-2,2-disubstituted propionyl halide. The reaction may be represented as follows:

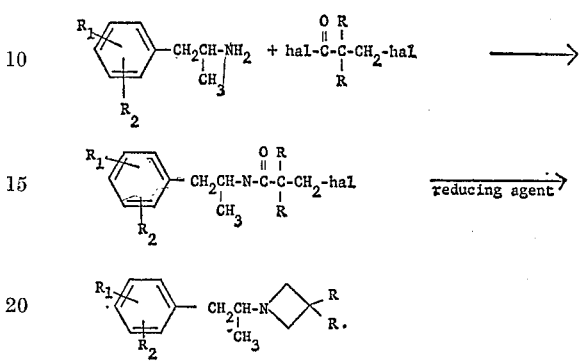

As indicated above, the intermediate compounds are prepared by reacting a substituted α-methylphenethyl amine with a halo-2,2-disubstituted propionyl halide wherein the disubstitution may be with alkyl, aryl or an alkyl group and an aryl group on the β carbon atom. However, the propionyl halide derivative having methyl as each of the R substituents is most conveniently utilized since this acid is commercially available. It is to be understood, of course, that the reaction will proceed as set forth herein where each R is selected from either alkyl or aryl.

In order to more clearly illustrate the novel compounds of this invention, reference is made to the following examples which are intended to demonstrate but a few specific embodiments of the invention and not to limit the same thereby.

Example 1.—3-chloro-2,2-dimethyl-N-[α-methyl-3-(trifluoromethyl)phenethyl]propionamide To a chilled mixture of 40.5 grams (0.2 molar) of α-methyl-3-trifluoromethyl-phenethylamine, 20.2 grams (0.2 molar) of triethylamine and 500 ml. anhydrous ether is added 31.0 grams (0.2 molar) of β-chloropropionyl chloride dropwise with stirring. The mixture is stirred in the cold for 2 hours, washed twice with water, and the ether layer dried over anhydrous magnesium sulfate. The drying agent is removed, the ether stripped and the crude residue air-dried.

The crude product is further purified by taking same up in ether, washing the ethereal solution with 50 ml. of 3% hydrochloric acid, then with water, then with 50 ml. of 3% sodium hydroxide solution, and finally again with water. The ethereal solution is then dried over anhydrous magnesium sulfate. The drying agent is removed, the ether stripped and a water-white residue crystallizes slowly on chilling; yielding 61.5 grams of 3-chloro-2,2-dimethyl-N-[α-methyl - 3 - (trifluoromethyl)phenethyl]propionamide having a melting point of 58–60° C.

Following the procedure of Example 1, various other such N-substituted-3-halo-2,2-dimethyl propionamides may be prepared. Table I following below contains a few representative species prepared in this manner, along with the identifying physical constants of each.

TABLE I

| Ex. | Compound | Empirical formula | M.P. in °C. | Calculated C | Calculated H | Calculated N | Found C | Found H | Found N |
|---|---|---|---|---|---|---|---|---|---|
| 2 | 3-chloro-2,2-dimethyl-N-[α-methyl-4-chlorophenethyl]propionamide | $C_{14}H_{19}Cl_2NO$ | 120.5–121.5 | 58.35 | 6.64 | 4.86 | 58.21 | 6.66 | 4.71 |
| 3 | 3-chloro-2,2-dimethyl-N-[α-methyl-3-chlorophenethyl]propionamide | $C_{14}H_{19}Cl_2NO$ | 58.5–60.5 | 58.38 | 6.64 | 4.86 | 58.63 | 6.68 | 5.03 |
| 4 | 3-chloro-2,2-dimethyl-N-[α-methyl-3,4-(dichloro)-phenethyl] propionamide | $C_{14}H_{18}Cl_3NO$ | 95–97 | 52.12 | 5.62 | 4.34 | 52.13 | 5.66 | 4.49 |
| 5 | 3-chloro-2,2-dimethyl-N-[α-methyl-4-fluorophenethyl]propionamide | $C_{14}H_{19}ClFNO$ | 77–79 | 61.88 | 7.05 | 5.15 | 61.56 | 7.07 | 4.96 |
| 6 | 3-chloro-2,2-dimethyl-N-[α-methyl-3-fluoro-phenethyl]propionamide | $C_{14}H_{19}ClFNO$ | 81–84.5 | 61.88 | 7.04 | 5.15 | 61.65 | 7.08 | 5.28 |
| 7 | 3-chloro-2,2-dimethyl-N-[α-methyl-4-(trifluoromethyl)phenethyl]propionamide | $C_{15}H_{19}ClF_3NO$ | 100–101 | 56.00 | 5.95 | 4.35 | 56.09 | 5.90 | 4.38 |
| 8 | 3-chloro-2,2-dimethyl-N-[α-methyl-4,5-(methylenedioxy)-phenethyl]propionamide | $C_{15}H_{20}ClNO_3$ | 88–90 | 60.50 | 6.77 | 4.70 | 60.33 | 6.66 | 4.71 |
| 9 | 3-chloro-N-[2(5-indanyl)-1-methylene]-2,2-dimethylpropionamide | $C_{17}H_{24}ClFNO$ | 113–114 | 69.49 | 8.23 | 4.76 | 69.42 | 8.02 | 4.86 |

Example 10.—1-(phenylisopropyl)-3,3-dimethylazetidine

A solution of 37.2 grams (0.125 molar) of 3-bromo-2,2-dimethyl-N[α-methylphenethyl]propionamide in 450 ml. of anhydrous ether is added dropwise to a suspension of 9.5 grams (0.25 molar) of lithium aluminum hydride in 100 ml. of anhydrous ether at a rate to maintain reflux, and stirred at room temperature for 5½ hours. The lithium aluminum hydride complex and excess lithium aluminum hydride are decomposed of dropwise consecutive addition of 9 ml. of water, 9 ml. of 15% sodium hydroxide solution and 27 ml. of water to the chilled reaction mixture while stirring and the mixture is stirred for an additional ½ hour. The solid is removed by filtration and washed with ether. The combined filtrate and washings are dried over magnesium sulfate. After removing the drying agent, the ether is stripped and the residue distilled. A fraction having a boiling point of 88–115° C. at 1.5 mm. of pressure, $N^{25}$, 1.4953 is obtained yielding a total of 28 grams of 1-(phenylisopropyl)-3,3-dimethyl azetidine. N.M.R. and I.R. data confirmed the identity of the compound.

Following the procedure of Example 10, a number of other azetidine derivatives may be prepared having one or more radicals substituted on the phenyl ring. In Table II below are listed a representative number of other such azetidines prepared from the correspondingly substituted 3-halo-2,2-dimethyl-phenethyl propionamide along with the identifying physical constants of each. In each case, N.M.R. and I.R. data confirmed the identity of the compound.

The acid-addition salts of the azetidine derivatives may be conveniently prepared by reacting the free base with the corresponding acid in a suitable solvent, such as ether. In such a manner, the hydrochloride, sulfate, phosphoric, fumarate, oxalate, and other such acid-addition salts may be prepared.

The free bases, as well as the acid-addition salts of the azetidine compounds, exhibit good activity as anorectic agents when administered orally or subcutaneously at dosages of between 1–50 milligrams per kilogram of body weight. The test procedure utilized to illustrate this biological activity is relatively simple. Two groups consisting of four rats each are placed on a five-hour feeding schedule; that is, the total feeding period for a 24 hour period is 5 hours for each group at the same time of the day, seven days a week. Approximately ½ hour before the feeding time is to commence, the control group is administered a standard dosage of saline solution and the test group is administered a dosage of one of the test compounds. A measured amount of feed is given to both groups (the same amount for each group) and at the end of the 5 hour feeding period, the food remaining is measured to determine intake.

In Table III following below is given the activity data found for a representative number of the compounds of this invention. In each case, the percentage figure represents the percent of food intake less than the controls at the expressed dosage level.

TABLE III

| Compound | Dosage, mg./kg. | Percent intake less than controls | $LD_{50}$, mg./kg. |
|---|---|---|---|
| 1. 1-(phenylisopropyl)-3,3-dimethyl azetidine·HCl | 3<br>10<br>12<br>20<br>40 | 51<br>59<br>57<br>63<br>82 | 300 |
| 2. 1-(4-chlorophenylisopropyl)-3,3-dimethyl azatidine·HCl | 3<br>12 | 41<br>36 | 500 |
| 3. 1-(3,4-dichlorophenylisopropyl)-3,3-dimethyl azetidine·HCl | 12 | 13 | 300 |
| 4. 1-(3-fluorophenylisopropyl)-3,3-dimethyl azetidine·HCl | 10 | 28 | 500 |
| 5. 1-(4-fluorophenylisopropyl)-3,3-dimethyl azetidine·HCl | 10 | 21 | 300 |
| 6. 1-(4-trifluoromethyl phenylisopropyl)-3,3-dimethyl azetidine·HCl | 14 | 26 | 750 |

The column headed "$LD_{50}$ mg./kg." in Table III above, indicates the oral disage in milligrams per kilogram of body weight, which is lethal to 50% of the test animals. In the above experiment, the test compounds were administered via the oral route, although other routes of administration, such as subcutaneous, intraperitoneal, and intra-

TABLE II

| Ex. | Compound | Empirical formula | B.P. in °C. | Calculated C | Calculated H | Calculated N | Found C | Found H | Found N |
|---|---|---|---|---|---|---|---|---|---|
| 11 | 1-(4-chlorophenylisopropyl)-3,3-dimethyl azetidine | $C_{14}H_{20}ClN$ | 110–124 at 1.1 mm. pressure | 70.72 | 8.48 | 5.89 | 70.74 | 8.71 | 5.7 |
| 12 | 1-(3-chlorophenylisopropyl)-3,3-dimethyl azetidine | $C_{14}H_{20}ClN$ | 116–120 at 1.9 mm. pressure | 70.72 | 8.48 | 5.89 | 70.99 | 8.62 | 5.99 |
| 13 | 1-(3,4-dichlorophenylisopropyl)-3,3-dimethyl azetidine | $C_{14}H_{19}Cl_2N$ | 138–141 at 1.5 mm. pressure | 61.78 | 7.03 | 5.14 | 61.60 | 7.09 | 5.25 |
| 14 | 1-(4-fluorophenylisopropyl)-3,3-dimethyl azetidine | $C_{14}H_{20}FN$ | 87–91 at 1.5 mm. pressure | 75.98 | 9.11 | 6.33 | 75.69 | 9.13 | 6.53 |
| 15 | 1-(3-fluorophenylisopropyl)-3,3-dimethyl azetidine | $C_{14}H_{20}FN$ | 87–90 at 1.4 mm. pressure | 75.98 | 9.11 | 6.33 | 70.69 | 9.14 | 6.43 |
| 16 | 1-(4-trifluoromethylphenyl isopropyl)-3,3-dimethyl azetidine | $C_{15}H_{20}F_3N$ | 97–103 at 1.3 mm. pressure | 66.40 | 7.43 | 5.16 | 65.84 | 7.68 | 5.41 |
| 17 | 1-(3-trifluoromethylphenyl isopropyl)-3,3-dimethyl azetidine | $C_{15}H_{20}F_3N$ | 93–103 at 2.0 mm. pfessure | 66.40 | 7.43 | 5.16 | 66.17 | 7.43 | 5.29 |
| 18 | 1-(4-5-methylenedioxy-phenyl isopropyl)-3,3-dimethyl azetidine | $C_{15}H_{21}NO_2$ | 136–142 at 1.3 mm. pressure | 72.84 | 8.56 | 5.66 | 72.75 | 8.33 | 5.69 |
| 19 | 1-[2(5-indanyl)-1-methylene ethyl]-3,3-dimethyl azetidine | $C_{17}H_{25}N$ | 133–137 at 1.3 mm. pressure | 83.90 | 10.35 | 5.75 | 83.65 | 10.49 | 5.83 | muscular, among others, may be successfully employed. Furthermore, the compounds were administered in the form of their hydrochloride acid-addition salts for the reason that these salts are very water-soluble and therefore pharmacologically easier to administer. It is to be understood, however, that the free bases as well as other acid-addition salts of the free bases exhibit similarly good activity as appetite depressants without undesirable side effects.

I claim:
1. A compound of the formula

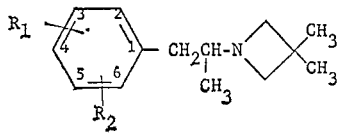

wherein $R_1$ and $R_2$ are each members independently selected from the group consisting of hydrogen, chlorine, fluorine, trifluoromethyl, and $R_1$ and $R_2$ taken together at the 4- and 5-positions forming a methylene dioxy ring, and $R_1$ and $R_2$ taken together at the 3- and 4-positions forming a cycloalkyl ring having from 3 to 5 carbon atoms; and the pharmaceutically acceptable acid-addition salts thereof.

2. A compound according to claim 1 wherein $R_1$ and $R_2$ are each hydrogen.

3. A compound according to claim 1 wherein $R_1$ is hydrogen and $R_2$ is 4-chloro.

4. The compounds according to claim 1 wherein the acid-addition salt is hydrochloride salt.

References Cited

UNITED STATES PATENTS 3,124,569   3/1964   Testa et al. _____ 260—239

ALTON D. ROLLINS, Primary Examiner

U.S. Cl. X.R.

260—340.5, 558 R, 562 B; 242—244, 282